US011569705B2

(12) United States Patent
Ueno et al.

(10) Patent No.: US 11,569,705 B2
(45) Date of Patent: Jan. 31, 2023

(54) ROTARY ELECTRIC MACHINE AND MANUFACTURING METHOD OF ROTARY ELECTRIC MACHINE

(71) Applicant: KYB Corporation, Tokyo (JP)

(72) Inventors: Sayaka Ueno, Tokyo (JP); Takayuki Kawaguchi, Tokyo (JP); Shun Matsuda, Tokyo (JP); Tarou Matsumae, Tokyo (JP)

(73) Assignee: KYB CORPORATION, Tokyo (JP)

( * ) Notice: Subject to any disclaimer, the term of this patent is extended or adjusted under 35 U.S.C. 154(b) by 76 days.

(21) Appl. No.: 17/182,197

(22) Filed: Feb. 22, 2021

(65) Prior Publication Data

US 2021/0265891 A1 Aug. 26, 2021

(30) Foreign Application Priority Data

Feb. 26, 2020 (JP) ............................. JP2020-030991

(51) Int. Cl.
*H02K 5/16* (2006.01)
*H02K 5/173* (2006.01)
*F16C 17/02* (2006.01)
*H02K 7/08* (2006.01)

(52) U.S. Cl.
CPC ............ *H02K 5/1732* (2013.01); *F16C 17/02* (2013.01); *H02K 7/083* (2013.01); *F16C 2380/26* (2013.01)

(58) Field of Classification Search
CPC ....... H02K 5/1732; H02K 7/083; F16C 17/02; F16C 2380/26
USPC .......................................................... 310/90
See application file for complete search history.

(56) References Cited

FOREIGN PATENT DOCUMENTS

EP            2924261 A1 *  9/2015  ............. F02B 37/04
JP         2017208872 A     11/2017
WO    WO-2015186455 A1 * 12/2015  ............... H02K 1/14

* cited by examiner

*Primary Examiner* — Terrance L Kenerly
(74) *Attorney, Agent, or Firm* — Rabin & Berdo, P.C.

(57) ABSTRACT

An object of the present invention is to hold a holding member appropriately in a casing.

A rotary electric machine includes a rotor having a drive shaft, a stator provided on an outer periphery of the rotor, a bearing B2 that rotatably supports the drive shaft, a holding member that contains an aluminum alloy member and holds the bearing, and a casing that houses the rotor, the stator, the bearing, and the holding member. The casing is made of a member that does not grow permanently or an aluminum alloy member that is permanently grown when the holding member is fixed to the casing. The holding member is in a state before permanent growth before being fixed in the casing, and the holding member grows permanently to be fixed more firmly to the casing.

7 Claims, 14 Drawing Sheets

ROTARY ELECTRIC MACHINE AND MANUFACTURING METHOD OF ROTARY ELECTRIC MACHINE

TECHNICAL FIELD

The present invention relates to a rotary electric machine and a manufacturing method of a rotary electric machine.

BACKGROUND ART

For example, as a rotary electric machine (motor) for a power steering system, a rotary electric machine described in Patent Literature 1 is known. As shown in Patent Literature 1, the rotary electric machine includes a rotor, a stator, a holding member that holds a bearing that rotatably supports the rotor, and a casing that houses the rotor, the stator, the bearing, and the holding member. In Patent Literature 1, the holding member has a peripheral surface portion elastically deformed inward in diameter, and is held on an inner peripheral surface of the casing by the elastic force of the peripheral surface portion.

CITATION LIST

Patent Literature

Patent Literature 1: JP 2017-208872 A

SUMMARY OF INVENTION

Technical Problem

Here, after fixing the holding member in the casing, it is desired to further strengthen the fixing.

The present invention has been made in view of the above, and an object of the present invention is to provide a rotary electric machine and a manufacturing method of a rotary electric machine that allow a holding member to be held appropriately in a casing.

Solution to Problem

In order to solve the above-mentioned problem and achieve the object, a rotary electric machine according to the present disclosure includes: a rotor having a drive shaft; a stator provided on an outer periphery of the rotor; a bearing that rotatably supports the drive shaft; a holding member that contains an aluminum alloy member and holds the bearing; and a casing that houses the rotor, the stator, the bearing, and the holding member. The casing is made of a member that does not grow permanently or an aluminum alloy member that has grown permanently before fixing the holding member to the casing, and the holding member is in a state before permanent growth when fixed in the casing, and the holding member grows permanently to be fixed more firmly to the casing.

It is preferable that, in the holding member, the ratio of the outer diameter when returned to room temperature after heating at 200° C. for five hours to the outer diameter at room temperature is 100.1% or more and 100.14% or less.

It is preferable that the holding member includes an ADC12 member.

It is preferable that the holding member is fixed in the casing by bringing an outer peripheral surface into contact with an inner peripheral surface of the casing.

It is preferable that the casing has an opening in a portion opposite to a part where the stator is provided in a part where the holding member is provided, in an extending direction of the drive shaft, the rotary electric machine further includes a cover member provided in the opening and fixed to the casing, and the holding member is fixed in the casing by coming into contact with the cover member.

It is preferable that the holding member includes a bearing holder that holds the bearing, and an annular ring that is in contact with a surface of the bearing holder and is made of an aluminum alloy member in a state before permanent growth before being fixed to the casing, and the ring fixes the bearing holder in the casing by bringing an outer peripheral surface into contact with an inner peripheral surface of the casing.

In order to solve the above-mentioned problem and achieve the object, a manufacturing method of a rotary electric machine according to the present disclosure is a manufacturing method of a rotary electric machine including a rotor having a drive shaft, a stator provided on an outer periphery of the rotor, a bearing that rotatably supports the drive shaft, a holding member that contains an aluminum alloy member and holds the bearing, and a casing that houses the rotor, the stator, the bearing, and the holding member, the manufacturing method including an insertion step of inserting the holding member before permanent growth into the casing made of a member that does not grow permanently or an aluminum alloy member that has permanently grown.

DESCRIPTION OF EMBODIMENTS

Hereinafter, preferred embodiments of the present invention will be described in detail with reference to the drawings. Note that the present invention is not limited to the embodiments described below.

First Embodiment

Figure 1:
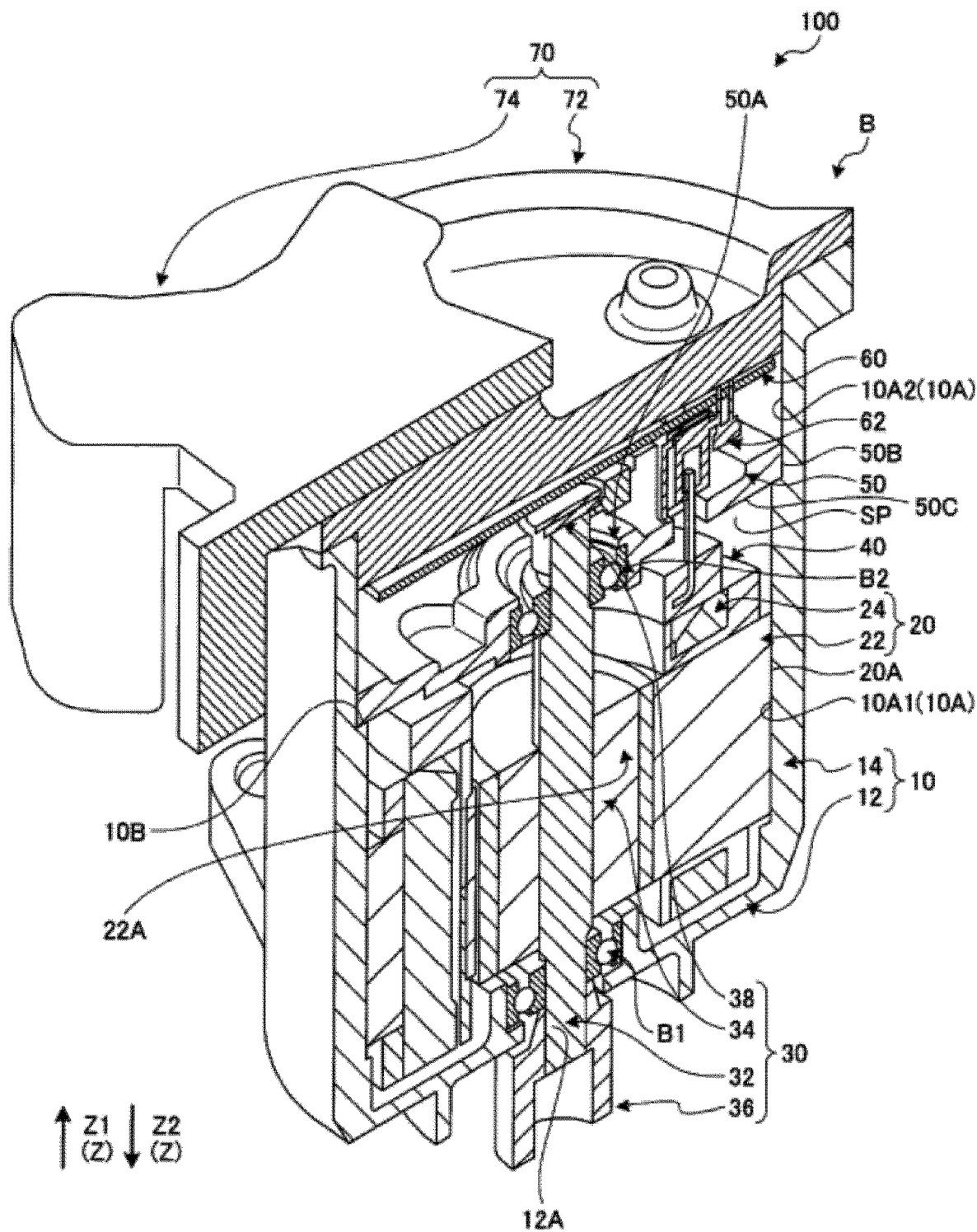
FIG. 1 is a cross-sectional view of a rotary electric machine according to a first embodiment.
Figure 2:
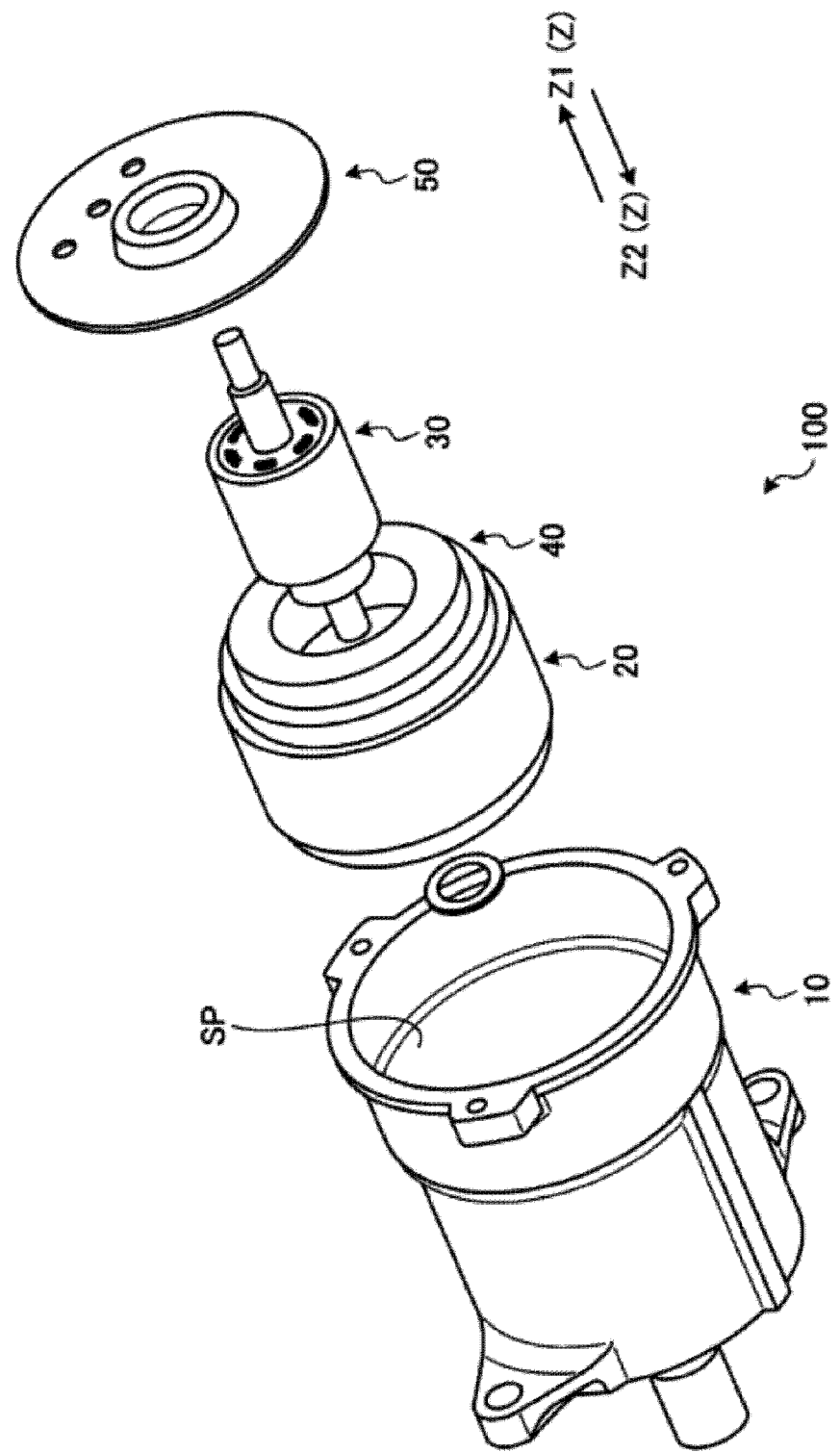
FIG. 2 is an exploded view of a part of the rotary electric machine according to the first embodiment.

FIG. 1 is a cross-sectional view of a rotary electric machine according to a first embodiment, and FIG. 2 is an exploded view of a part of the rotary electric machine according to the first embodiment. A rotary electric machine 100 according to the first embodiment is a motor, more specifically, a brushless motor. The rotary electric machine 100 is used in an electric steering device of a vehicle, for example, and applies a steering assist force to a steering shaft of the vehicle. Note, however, that the application of the rotary electric machine 100 is not limited to this.

As shown in FIG. 1, the rotary electric machine 100 includes a casing 10, a stator 20, a rotor 30, a bus bar unit 40, a holding member 50, a board 60, a cover member 70, and bearings B1, B2. Note that FIG. 2 is an exploded view of the casing 10, the stator 20, the rotor 30, the bus bar unit 40, and the holding member 50, and the board 60 and the cover member 70 are omitted. Hereinafter, a direction along the axial direction of the rotor 30, more specifically, a drive shaft 32 described later, is referred to as direction Z. Then, one of directions along direction Z is referred to as direction Z1, and the other direction of the directions along direction Z, that is, the direction opposite to direction Z1 is referred to as direction Z2.

As shown in FIG. 1, the casing 10 is a housing that internally houses the stator 20, the rotor 30, the bus bar unit 40, the holding member 50, and the board 60. The casing 10 is a hollow member that is open on the direction Z1 side, and in the present embodiment, is a cylindrical member that is circular when viewed in direction Z. The casing 10 includes a bottom portion 12 and a side portion 14. The bottom portion 12 forms a bottom surface of the casing 10 on the direction Z2 side. An opening 12A through which the drive shaft 32 described later is inserted is formed in the bottom portion 12. Additionally, a bearing B1 which is a bearing is provided on a surface of the bottom portion 12 on the direction Z1 side. The bearing B1 is provided so as to surround the opening 12A when viewed in direction Z, and is fixed to the bottom portion 12. The side portion 14 forms a side surface of the casing 10. The side portion 14 is provided so as to surround the outer edge of the bottom portion 12, and extends in direction Z1 from the outer edge of the bottom portion 12. The casing 10 houses the stator 20, the rotor 30, the bus bar unit 40, the holding member 50, and the board 60 in a space SP surrounded by the bottom portion 12 and the side portion 14. Since an end portion of the casing 10 on the direction Z1 side is open, the space SP communicates with the outside on the direction Z1 side. It can be said that the opening of the casing 10 on the direction Z1 side is formed on the opposite side (direction Z1 side) of the part where the stator 20 is provided in the part where the holding member 50 is provided in direction Z.

The side portion 14 includes a side portion 14A1 and a side portion 14A2. The side portion 14A1 is a portion of the side portion 14 on the direction Z2 side, and projects from the outer edge of the bottom portion 12 toward the direction Z1 side. The side portion 14A2 is a portion provided on the direction Z1 side of the side portion 14A1, and projects further toward the direction Z1 side from an end portion of the side portion 14A1 on the direction Z1 side. Assuming that an inner peripheral surface of the side portion 14A1 is an inner peripheral surface 10A1 and an inner peripheral surface of the side portion 14A2 is an inner peripheral surface 10A2, the inner diameter of the side portion 14A2 (inner peripheral surface 10A2) is larger than the inner diameter of the side portion 14A1 (inner peripheral surface 10A1). The inner peripheral surface 10A2 and the inner peripheral surface 10A1 are connected by a seat surface 10B which is a step. Hereinafter, when referring to the inner peripheral surface 10A1 and the inner peripheral surface 10A2 with no distinction, they are referred to as an inner peripheral surface 10A. It can be said that the inner peripheral surface 10A is both an inner peripheral surface of the casing 10 and an inner peripheral surface of the side portion 14. Note, however, that the casing 10 is not limited to the structure having an inner diameter that varies in direction Z as in the inner peripheral surfaces 10A1, 10A2, and may have an inner diameter that is constant in direction Z, for example.

The casing 10 is made of an aluminum alloy member. More specifically, the casing 10 is made of a member of ADC12 standardized by JIS. Note, however, that the casing 10 does not necessarily have to be made of ADC12, and may be made of an aluminum alloy that undergoes permanent growth.

The stator 20 is a stator of the rotary electric machine 100. The stator 20 is provided in the casing 10, that is, in the space SP of the casing 10. The stator 20 includes a stator core 22 and a stator coil 24. The stator core 22 is the core of the stator 20, and a through hole 22A penetrating in direction Z is formed at the center position when viewed in direction Z. The stator core 22 is made of a magnetic material, and more specifically, is made of an iron-based member. An iron-based member is a member containing iron as a main component. More specifically, the stator core 22 according to the present embodiment is made of an electromagnetic steel plate. The stator core 22 is made by laminating electromagnetic steel plate members in direction Z. Note, however, that the stator core 22 does not necessarily have to be made of electromagnetic steel plates, and does not necessarily have to be made of members laminated in direction Z. The stator core 22 may be an iron-based member that does not grow permanently.

The stator coil 24 is a coil of the stator 20. The stator coil 24 includes U-phase, V-phase, and W-phase electromagnetic coils. The stator coil 24 is wound around the stator core 22.

The stator 20 is fixed to the casing 10 by bringing an outer peripheral surface 20A into contact with the inner peripheral surface 10A of the casing 10. More specifically, the outer peripheral surface 20A of the stator 20 is in contact with the inner peripheral surface 10A1 of the casing 10 on the direction Z2 side. That is, the stator 20 is fitted to the casing 10 by being interference-fitted (press-fitted) into the casing 10. It can be said that the outer peripheral surface 20A of the stator 20 and the inner peripheral surface 10A of the casing 10 are fitted portions. Incidentally, it can be said that the outer peripheral surface 20A is also an outer peripheral surface of the stator core 22.

The rotor 30 is a rotor of the rotary electric machine 100. The rotor 30 is provided in the space SP of the casing 10. The rotor 30 includes the drive shaft 32 and a rotor core 34. The rotor core 34 is the core of the rotor 30. The rotor core 34 includes a plurality of magnetic poles arranged in the circumferential direction. The rotor core 34 has a through hole penetrating in direction Z formed at the center position when viewed in direction Z. The drive shaft 32 is a shaft, which is inserted into the through hole of the rotor core 34 and fixed to the rotor core 34. That is, the drive shaft 32 is interference-fitted (press-fitted) to the rotor core 34. In the rotor 30, an outer peripheral surface of the rotor core 34 is provided in the through hole 22A of the stator core 22. The rotor 30 is provided in the through hole 22A so that the axial direction of the drive shaft 32 is along direction Z. Additionally, the rotor 30 is provided in the through hole 22A so as to be rotatable with respect to the stator 20. Since the rotor 30 is inserted into the through hole 22A in this way, it can be said that the stator 20 is provided on the outer periphery of the rotor 30. The rotor 30 rotates about the central axis of the drive shaft 32 extending along direction Z as a rotation axis, due to electromagnetic action with the stator 20.

Additionally, a gear portion 36 is attached to an end portion of the drive shaft 32 on the direction Z2 side. The gear portion 36 meshes with a gear (not shown) on the other side that communicates with the steering shaft, and transmits the rotation of the drive shaft 32 to the steering shaft. Additionally, a detector 38 is attached to an end portion of the drive shaft 32 on the direction Z1 side. The detector 38 is a member for detecting the rotation speed of the rotor 30, and is a magnet or a magnetic sensor, for example.

The bus bar unit 40 is provided on the direction Z1 side of the stator coil 24 in the space SP of the casing 10. The bus bar unit 40 is a plate-shaped (disk-shaped in this example) member including a plurality of bus bars and a bus bar holder. The bus bar is a conductive member and is connected to each of the U phase, V phase, and W phase of the stator coil 24. The bus bar holder is an insulating member and covers the bus bar.

The holding member 50 is provided on the direction Z1 side of the bus bar unit 40 in the space SP of the casing 10. The holding member 50 is a plate-shaped (disc-shaped in this example) member that holds the bearing B2. The holding member 50 has a surface 50C on the direction Z2 side which is in contact with the seat surface 10B formed between the inner peripheral surface 10A1 and the inner peripheral surface 10A2 of the side portion 14. The holding member 50 is fixed to the casing 10 by bringing an outer peripheral surface 50B into contact with the inner peripheral surface 10A2 of the casing 10. That is, the holding member 50 is interference-fitted (press-fitted) to the casing 10. The holding member 50 is fixed to the casing 10 in a state where the surface 50C is in contact with the seat surface 10B. Additionally, the holding member 50 has a through hole 50A formed at the center position when viewed in direction Z. A bearing B2 which is a bearing is provided in the through hole 50A. Since the bearing B2 is fixed to the holding member 50, it can be said that the bearing B2 is fixed to the casing 10 through the holding member 50. The holding member 50 is made of an aluminum alloy member. More specifically, the holding member 50 is made of an ADC12 member. Note, however, that the holding member 50 does not necessarily have to be made of ADC12, and may be made of an aluminum alloy that undergoes permanent growth.

Note that the drive shaft 32 of the rotor 30 is rotatably supported by the bearings B1, B2. That is, a portion of the drive shaft 32 on the direction Z2 side is rotatably inserted into the bearing B1, and a portion on the direction Z1 side of the portion inserted into the bearing B1 is rotatably inserted into the bearing B2.

The board 60 is provided on the direction Z1 side of the holding member 50 in the space SP of the casing 10. The board 60 is a circuit board on which a circuit of an ECU (electronic control unit) of the rotary electric machine 100 is provided. The board 60 is electrically connected to the bus bar of the bus bar unit 40 through a connecting portion 62 provided between the board 60 and the bus bar unit 40.

The cover member 70 is provided on the end portion of the casing 10 on the direction Z1 side. The cover member 70 includes a cover 72 and a terminal portion 74. The cover 72 is a cover that closes an opening on the direction Z1 side of the space SP of the casing 10. The cover 72 is attached to the casing 10 so as to cover the opening at the end portion of the casing 10 on the direction Z1 side. The cover 72 is preferably made of the same member as the casing 10. The terminal portion 74 is attached to the cover 72. The terminal portion 74 includes a wiring (not shown) electrically connected to the circuit of the board 60 and a terminal connected to the wiring.

The rotary electric machine 100 having the above configuration is used in a high temperature environment of 105° C. or higher, for example. Aluminum alloys are heated by being placed in such a high temperature environment and grow permanently. Permanent growth refers to dimensional changes due to precipitation of overdissolved elements in a high temperature environment. Since permanent growth is an irreversible expansion, even if the permanently grown member is cooled after heating, the expanded portion corresponding to the permanent growth does not return to the original state. In the present embodiment, this phenomenon of permanent growth is utilized to hold the holding member 50 including the aluminum alloy member appropriately by the casing 10. The details will be described below.

In the present embodiment, the holding member 50 before permanent growth is incorporated into the rotary electric machine 100. In other words, in the present embodiment, the holding member 50 before permanent growth is inserted into the casing 10. That is, the holding member 50 is in a state before permanent growth before the use of the rotary electric machine 100, in other words, before the holding member 50 is fixed in the casing 10. The state before permanent growth means that the holding member 50 has not grown permanently and can grow permanently by heating. What is more, the state before permanent growth preferably refers to a state in which no permanent growth has occurred in the holding member 50. Additionally, the permanently grown state refers to a state in which the holding member 50 has already grown permanently. What is more, the permanently grown state more preferably refers to a state in which the holding member 50 has permanently grown to the maximum and does not grow any more (i.e., state in which permanent growth is saturated). Additionally, here, before the use of the rotary electric machine 100 refers to a state before the rotary electric machine 100 is mounted on an object such as a vehicle on which the rotary electric machine 100 is mounted (state in which rotary electric machine 100 is not mounted on object). What is more, assuming that an environment in which the holding member 50 before permanent growth becomes permanently grown is a permanent growth environment, the use of the rotary electric machine 100 refers to placing the rotary electric machine 100 to which the holding member 50 is assembled in a permanent growth environment. That is, before the use of the rotary electric machine 100 refers to a state in which the rotary electric machine 100 to which the holding member 50 is assembled has not been placed in a permanent growth environment so far. The permanent growth environment refers to placing a member in a predetermined temperature for a predetermined time, where the predetermined temperature is 105° C. or higher, for example, and the predetermined time is five hours or longer, for example.

Additionally, in the present embodiment, the permanently grown casing 10 is incorporated into the rotary electric machine 100. In other words, in the present embodiment, the holding member 50 before permanent growth is inserted into the permanently grown casing 10. That is, the casing 10 is in a permanently grown state before the use of the rotary electric machine 100, in other words, before the holding member 50 is fixed to the casing 10. In the present embodiment, the casing 10 is brought into a permanently grown state by heating the casing 10 by a heat treatment. The heat treatment here can be rephrased as placing the casing 10 in a permanent growth environment. That is, the heat treatment condition here may be that the casing 10 is heated to the above-mentioned predetermined temperature for a predetermined time. What is more, in the present embodiment, the casing 10 is subjected to a T5 treatment as a heat treatment. The T5 treatment here is, for example, a treatment in which a member is heated at 200° C. or higher and 240° C. for 2 hours or more and 6 hours or less to quench the member. Note, however, that the heat treatment condition here may be any condition as long as the casing 10 is brought into a permanently grown state.

Note that in the present embodiment, it is preferable that the casing 10 is heated to bring the casing 10 into a permanently grown state before assembling the casing 10 to the rotary electric machine 100, in other words, before inserting the holding member 50 into the casing 10.

Figure 3:
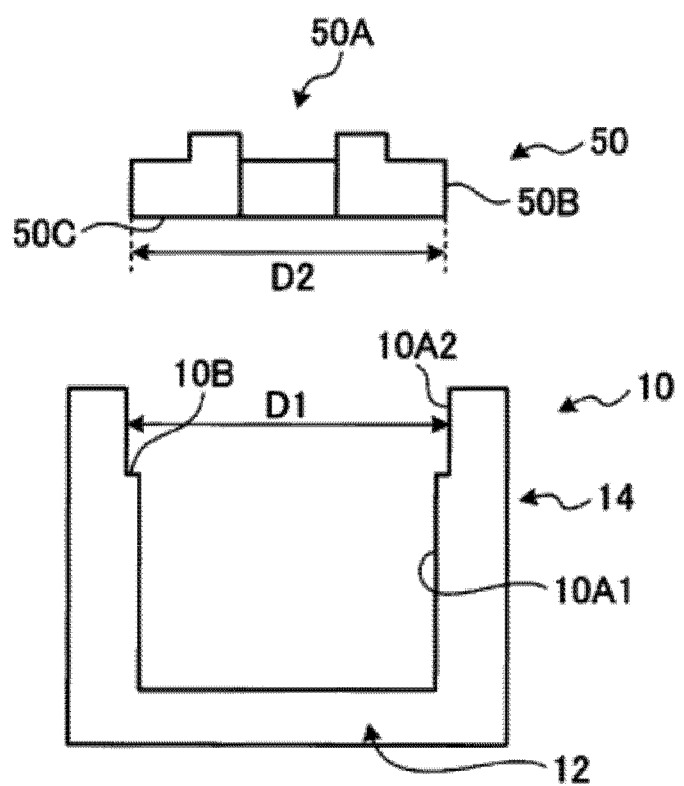
FIG. 3 is a schematic view showing the inner diameter of a casing and the outer diameter of a holding member according to the first embodiment.

FIG. 3 is a schematic view showing the inner diameter of the casing and the outer diameter of the holding member according to the first embodiment. As shown in FIG. 3, hereinafter, the inner diameter of the casing 10 is referred to as an inner diameter D1, and the outer diameter of the holding member 50 is referred to as an outer diameter D2. The inner diameter D1 is the inner diameter of the side portion 14A2 of the casing 10, that is, the inner diameter of the inner peripheral surface 10A2. Here, the difference between the outer diameter D2 and the inner diameter D1 when the holding member 50 is removed from the casing 10 is defined as a dimensional difference D. That is, it can be said that the dimensional difference D is a value obtained by subtracting the inner diameter D1 of the casing 10 from the outer diameter D2 of the holding member 50 when the holding member 50 is removed from the casing 10 after the holding member 50 is inserted into and fixed to the casing 10. It can be said that the dimensional difference D corresponds to the tightening margin between the casing 10 and the holding member 50. In this case, in the rotary electric machine 100, it is preferable that the ratio of the dimensional difference D to the inner diameter D1 when the holding member 50 is removed from the casing 10 before the use of the rotary electric machine 100 is 0.02% or more and 0.22% or less. When this ratio is 0.02% or more, the tightening load between the holding member 50 and the casing 10 is maintained appropriately, and when the ratio is 0.22% or less, damage to the casing 10 and the holding member 50 due to excessively high press-fit force can be curbed.

As described above, in the present embodiment, before the use of the rotary electric machine 100, the holding member 50 assembled to the rotary electric machine 100 is in a state before permanent growth, and the casing 10 assembled to the rotary electric machine 100 is in a permanently grown state. For this reason, when the rotary electric machine 100 is used, that is, when the rotary electric machine 100 is placed in a permanent growth environment, the holding member 50 grows permanently, while the casing 10 does not grow any more. Hence, after the use of the rotary electric machine 100, the outer diameter D2 of the holding member 50 increases due to the permanent growth, and the inner diameter D1 of the casing 10 does not increase due to permanent growth. Accordingly, the dimensional difference D after the use of the rotary electric machine 100 is larger than the dimensional difference D before the use of the rotary electric machine 100. That is, in the present embodiment, with the use of the rotary electric machine 100, the tightening margin (dimensional difference D) between the holding member 50 and the casing 10 increases and the tightening load increases. In other words, the holding member 50 grows permanently after being fixed to the casing 10, to be fixed more firmly to the casing 10 (i.e., tightening load becomes higher) than before the permanent growth. For this reason, according to the rotary electric machine 100 of the present embodiment, the tightening load can be increased with use, and the holding member 50 can be held appropriately in the casing 10. Note that the ratio of the dimensional difference D to the inner diameter D1 when the holding member 50 is removed from the casing 10 after the use of the rotary electric machine 100 is preferably 0.14% or more and 0.34% or less.

As described above, in the present embodiment, the casing 10 is made of a permanently growing aluminum alloy, and has grown permanently before the use of the rotary electric machine 100. Note, however, that the casing 10 does not necessarily have to be made of an aluminum alloy. The casing 10 may be made of a member that does not grow permanently, and may be made of an iron-based member, for example. An iron-based member is a member containing iron as a main component. Even if the casing 10 is made of an iron-based member that does not grow permanently, the tightening margin can be increased and the tightening load can be increased with the use of the rotary electric machine 100.

Note that when the holding member 50 is interference-fitted to the casing 10, at least one of the casing 10 and the holding member 50 is plastically deformed. It can be said that the dimensional difference D is the difference between the outer diameter D2 and the inner diameter D1 after the holding member 50 is interference-fitted to the casing 10, that is, after the plastic deformation. For this reason, the difference between the outer diameter D2 and the inner diameter D1, that is, the press-fitting margin before the holding member 50 is press-fitted into the casing 10 is a value obtained by adding the plastic deformation amount to the dimensional difference D after the interference-fitting.

Additionally, the holding member 50 is in a state before permanent growth, and therefore grows permanently by heating. Here, the outer diameter D2 at room temperature of the holding member 50 in the state before permanent growth before the use of the rotary electric machine 100 is defined as a reference outer diameter. The room temperature here is 25° C., for example. Additionally, the outer diameter D2 of the holding member 50 when the holding member 50 in the state before permanent growth before the use of the rotary electric machine 100 is heated at 200° C. for five hours and then returned to room temperature is defined as a permanent growth outer diameter. In this case, the ratio of the permanent growth outer diameter to the reference outer diameter is preferably 100.1% or more and 100.14% or less.

Additionally, although the casing 10 is permanently grown, it expands reversibly by heating. The reversible thermal expansion here is a thermal expansion that depends on the coefficient of linear expansion. In the casing 10, it is preferable that the ratio of the inner diameter D1 when heated at 200° C. for five hours to the inner diameter D1 at room temperature is 100.35% or more and 100.39% or less, for example. Note that the room temperature here is 25° C., for example. That is, since the casing 10 is permanently grown, the amount of expansion when placed in a high temperature environment does not depend on permanent growth, but depends on reversible thermal expansion.

Figure 4:
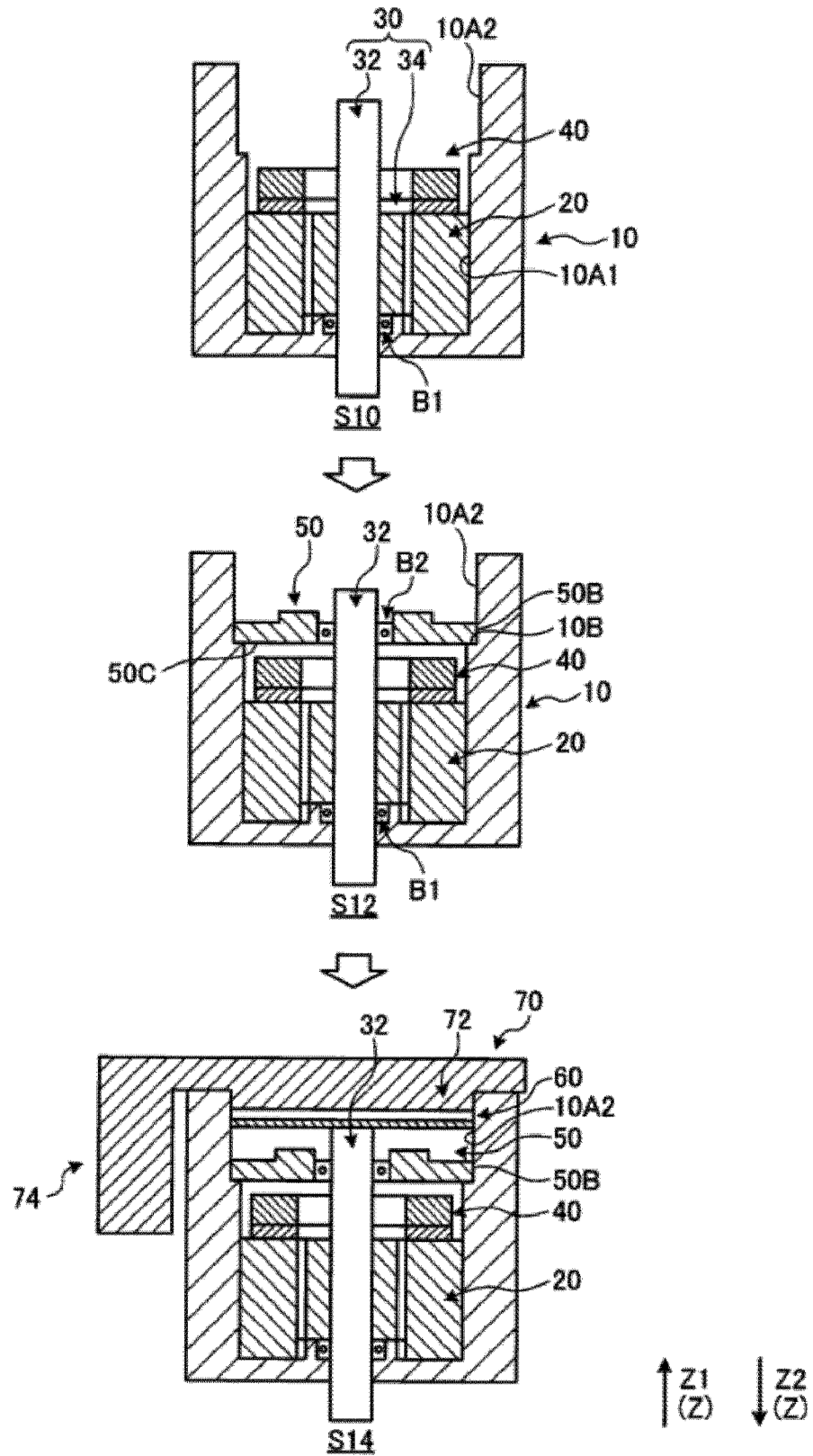
FIG. 4 is a diagram illustrating a manufacturing method of a rotary electric machine according to the first embodiment.

Next, a manufacturing method of the rotary electric machine 100 will be described. FIG. 4 is a diagram illustrating a manufacturing method of a rotary electric machine according to the first embodiment. As shown in FIG. 4, when manufacturing the rotary electric machine 100, the stator 20, the rotor 30, and the bus bar unit 40 are inserted into the permanently grown casing 10 (step S10). What is more, prior to step S10, the casing 10 may be heated to bring the casing 10 into a permanently grown state. In the present embodiment, after the casing 10 is manufactured by casting, the casing 10 is heated to bring the casing 10 into a permanently grown state. Then, by machining the inner peripheral surface 10A of the permanently grown casing 10, the inner diameter of the permanently grown casing 10 is set to the inner diameter D1 before the stator 20 is inserted into the casing 10. Note, however, that machining is not an essential process.

Then, the holding member 50 in the state before permanent growth is inserted into the permanently grown casing 10, and the inner peripheral surface 10A2 of the casing 10 and the outer peripheral surface 50B of the holding member 50 are brought into contact with each other to fix the holding member 50 to the casing 10 (step S12; insertion step). In step S12, the holding member 50 is inserted into the space SP through the opening at the end portion of the casing 10 on the direction Z1 side. In the present embodiment, the holding member 50 is inserted into the casing 10 by shrink fitting. That is, with the permanently grown casing 10 heated and the inner diameter of the casing 10 expanded, the holding member 50 is inserted to bring the surface 50C of the holding member 50 into contact with the seat surface 10B of the casing 10. Then, by cooling the casing 10 with the holding member 50 placed in the casing 10, the inner diameter of the casing 10 is restored, and the inner peripheral surface 10A2 of the casing 10 and the outer peripheral surface 50B of the holding member 50 come into contact with each other. Thus, the holding member 50 is brought into an interference-fitted state fixed to the casing 10. Note, however, that the method of inserting the holding member 50 into the casing 10 is not limited to shrink fitting. For example, the holding member 50 may be press-fitted into the unheated casing 10. Additionally, the stator 20 may also be shrink-fitted into the casing 10.

After fixing the holding member 50 to the casing 10, the board 60 and the cover member 70 are assembled to the casing 10 (step S14) to complete the production of the rotary electric machine 100.

As described above, the rotary electric machine 100 according to the present embodiment includes the rotor 30 having the drive shaft 32, the stator 20 provided on the outer periphery of the rotor 30, the bearing B2 that rotatably supports the drive shaft 32, the holding member 50 that contains an aluminum alloy member and holds the bearing B2, and the casing 10 that houses the rotor 30, the stator 20, the bearing B2, and the holding member 50. When fixed in the casing 10, the holding member 50 is in a state before permanent growth. The casing 10 is made of a member that does not grow permanently or an aluminum alloy member that has grown permanently before fixing the holding member 50 to the casing 10. The holding member 50 grows permanently to be fixed more firmly to the casing 10. Here, the rotary electric machine 100 is used in a high temperature environment. For this reason, in the rotary electric machine 100, the holding member 50 grows permanently with use, so that the tightening margin (dimensional difference D) between the holding member 50 and the casing 10 increases, and the tightening load between the holding member 50 and the casing 10 increases. As described above, according to the rotary electric machine 100 of the present embodiment, the tightening load can be increased and the holding member 50 can be held appropriately in the casing 10 by simply using the rotary electric machine 100, in other words, simply placing the rotary electric machine 100 in a high temperature environment. What is more, according to the rotary electric machine 100 of the present embodiment, since the holding member 50 can be held appropriately in the casing 10 without fixing the holding member 50 to the casing 10 with a fastening member such as a screw, for example, a fastening process such as screwing becomes unnecessary, and the manufacturing process can be simplified. Moreover, according to the rotary electric machine 100 of the present embodiment, since the tightening margin can be increased afterward by using the rotary electric machine 100, it becomes unnecessary to set a large press-fitting margin at the time of press fitting, and the press-fitting equipment and the shrink-fitting equipment can be forcibly enlarged.

Additionally, in the holding member 50, it is preferable that the ratio of the outer diameter D2 (outer diameter after permanent growth) when returned to room temperature after heating at 200° C. for five hours to the outer diameter D2 (reference outer diameter) at room temperature is 100.1% or more and 100.14% or less. According to the rotary electric machine 100, by using such a holding member 50, the holding member 50 can be held appropriately in the casing 10.

Additionally, the holding member 50 preferably includes an ADC12 member. The rotary electric machine 100 according to the present embodiment can be mounted on a vehicle appropriately by using the holding member 50 made of ADC12. Additionally, by setting the holding member 50 to the state before permanent growth, the holding member 50 can be held appropriately on the inner peripheral surface of the casing 10 even when the holding member 50 made of ADC12 is used.

Additionally, the holding member 50 is fixed in the casing 10 by bringing the outer peripheral surface 50B into contact with the inner peripheral surface 10A2 of the casing 10. The rotary electric machine 100 according to the present embodiment can hold the holding member 50 appropriately in the casing 10 by fixing the outer peripheral surface 50B of the holding member 50 to the inner peripheral surface 10A2 of the casing 10.

Additionally, the manufacturing method of the rotary electric machine 100 according to the present embodiment includes an insertion step. In the insertion step, the holding member 50 before permanent growth is inserted into the casing 10 made of a member that does not grow permanently or an aluminum alloy that has permanently grown. According to the manufacturing method of the rotary electric machine 100 according to the present embodiment, since the holding member 50 before permanent growth is inserted into the casing 10 made of a member that is permanently grown or does not grow permanently, the holding member 50 can be held appropriately in the casing 10.

Second Embodiment

Next, a second embodiment will be described. A rotary electric machine 100a according to the second embodiment is different from the first embodiment in that a holding member 50a is fixed to a cover member 70a. In the second embodiment, the parts having the same configuration as the first embodiment will not be described.

Figure 5:
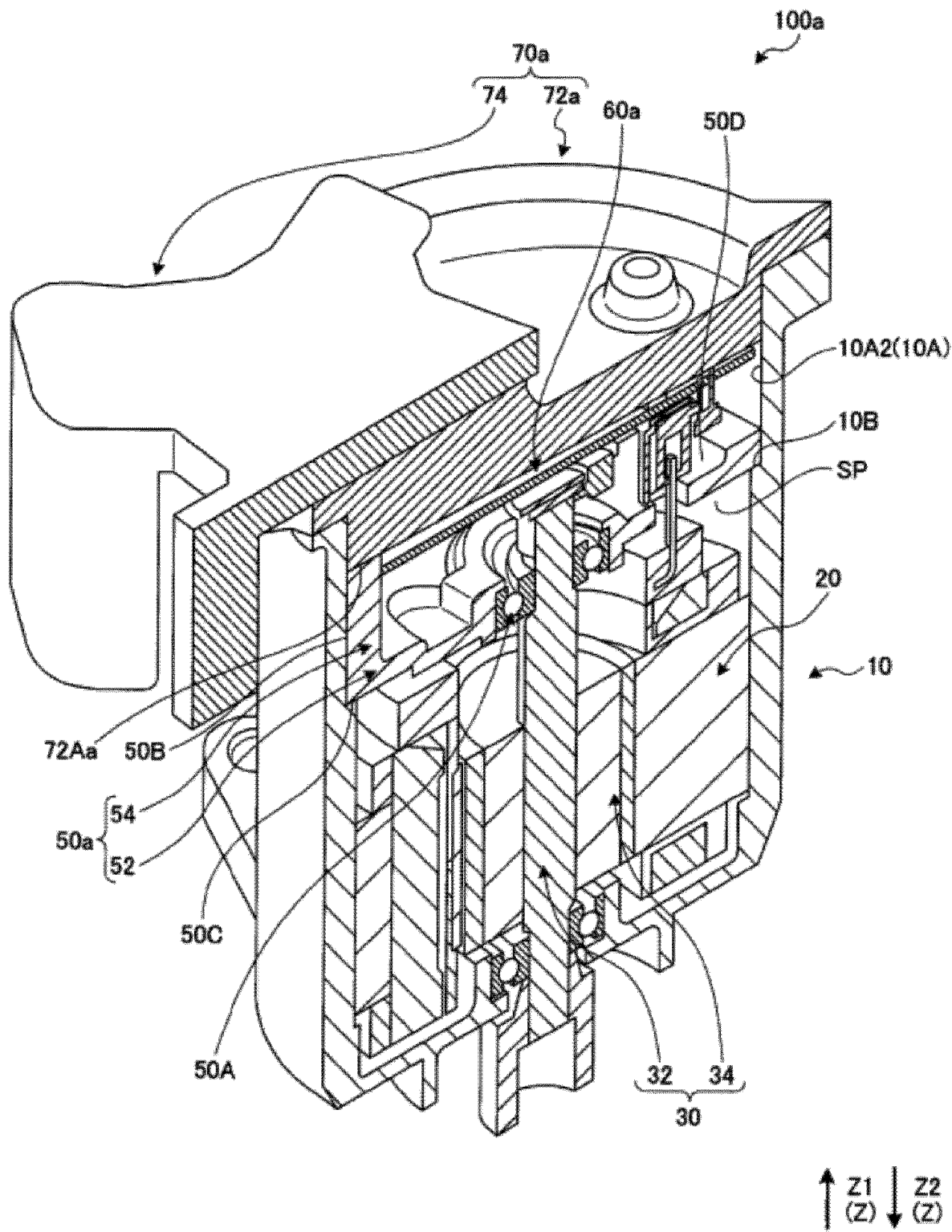
FIG. 5 is a cross-sectional view of a rotary electric machine according to a second embodiment.
Figure 6:
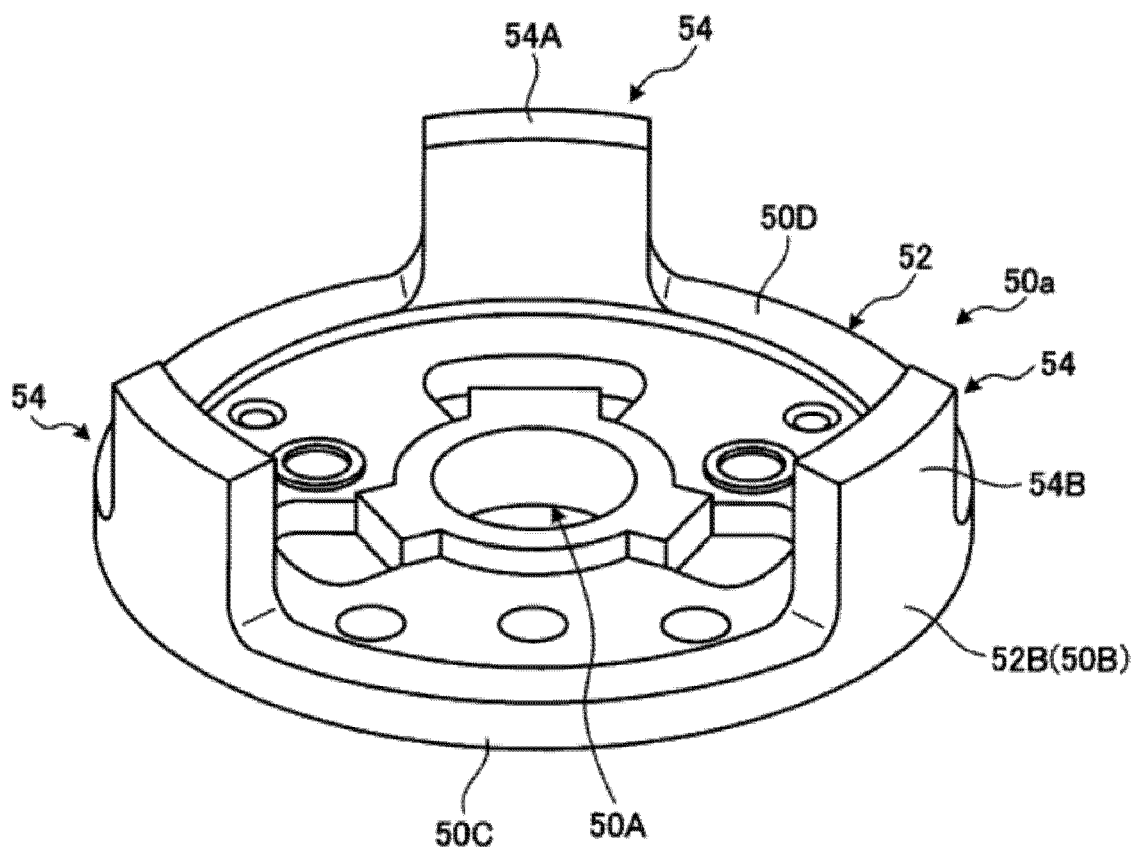
FIG. 6 is a schematic view of a holding member according to the second embodiment.

FIG. 5 is a cross-sectional view of the rotary electric machine according to the second embodiment. FIG. 6 is a schematic view of the holding member according to the second embodiment. As shown in FIG. 5, the rotary electric machine 100a according to the second embodiment includes the holding member 50a and the cover member 70a. As shown in FIG. 6, the holding member 50a includes a holding portion 52 and an extension portion 54. The holding portion 52 is a plate-shaped (disc-shaped in this example) member that holds a bearing B2. The holding portion 52 has a through hole 50A formed at the center position when viewed in direction Z, and the bearing B2 is provided in the through hole 50A. A surface 50C of the holding portion 52 on the direction Z2 side is in contact with a seat surface 10B of a casing 10. The extension portion 54 projects from a surface 50D of the holding portion 52 on the direction Z1 side to an end portion 54A toward the direction Z1 side. The extension portion 54 projects from the outer edge portion of the holding portion 52 on the surface 50D side toward the direction Z1 side. Additionally, in the example of FIG. 6, multiple (three in this example) extension portions 54 are provided in the circumferential direction of the holding portion 52. Additionally, in the present embodiment, an outer peripheral surface 52B of the holding portion 52 is located radially outward of an outer peripheral surface 54B of the extension portion 54. It can be said that the outer peripheral surface 52B of the holding portion 52 corresponds to an outer peripheral surface 50B of a holding member 50a. Note that the shape and number of the extension portions 54 are arbitrary. For example, the outer peripheral surface 52B of the holding portion 52 does not necessarily have to be located radially outward of the outer peripheral surface 54B of the extension portion 54, and the outer peripheral surface 52B and the outer peripheral surface 54B may be at the same position in the radial direction, or the outer peripheral surface 54B may be located radially outward of the outer peripheral surface 52B. Note that the radial direction here is the radial direction when the central axis of the holding member 50a along direction Z is the center. Additionally, the outer peripheral surface 52B of the holding portion 52 is a surface on the outer side in the radial direction when the central axis of the holding member 50a along direction Z is the center.

As shown in FIG. 5, the cover member 70a includes a cover 72a and a terminal portion 74. The cover 72a is made of the same member as the casing 10. The cover 72a is provided in an opening on the direction Z1 side of the space SP of the casing 10, and closes the opening. The cover 72a is fixed to the casing 10 while being inserted into the space SP through the opening of the casing 10 on the direction Z1 side. While the cover 72a is fixed to the casing 10 by bolts B as shown in FIG. 5, the method of fixing the cover 72a to the casing 10 is arbitrary. For example, the cover 72a may be fixed to the casing 10 by bringing an outer peripheral surface of the portion inserted into the space SP into contact with an inner peripheral surface 10A2 of the casing 10, that is, by interference fitting.

Figure 7:
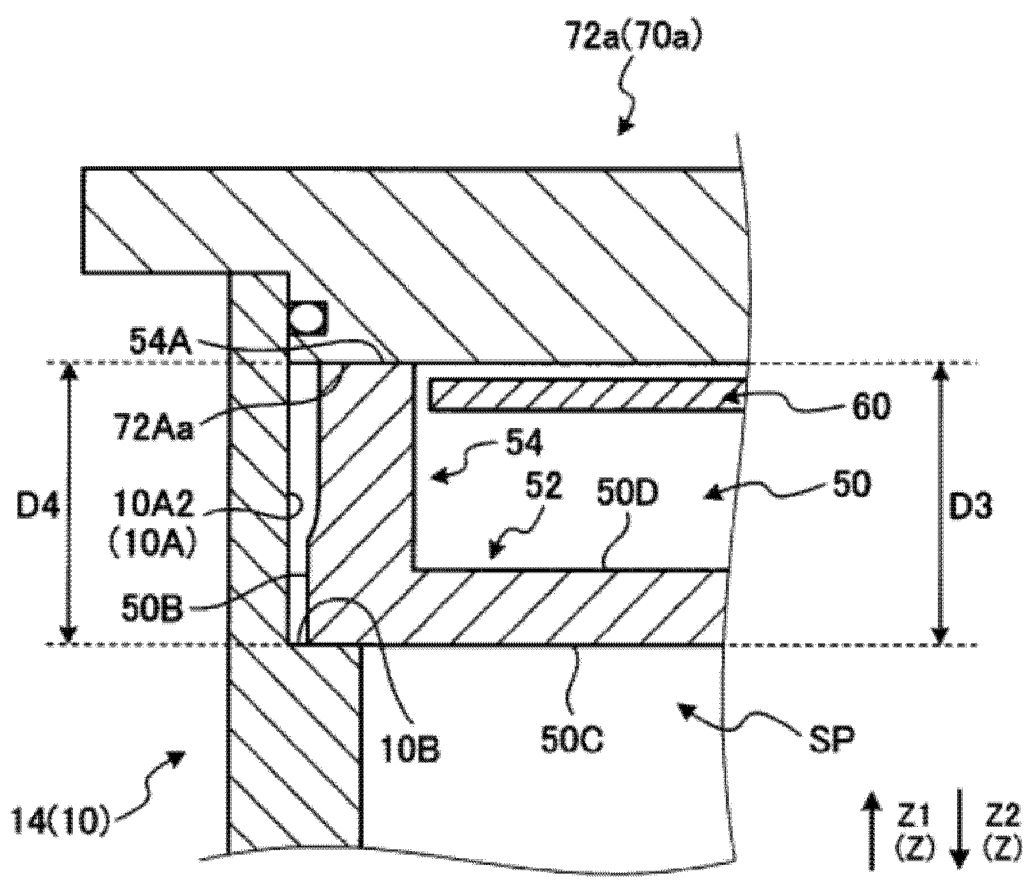
FIG. 7 is a schematic view showing a fixed state of the holding member according to the second embodiment.

FIG. 7 is a schematic view showing a fixed state of the holding member according to the second embodiment. As shown in FIG. 7, in the rotary electric machine 100a, the outer peripheral surface 50B of the holding member 50a (outer peripheral surface 52B of holding portion 52) is not in contact with the inner peripheral surface 10A2 of the casing 10, and the outer peripheral surface 50B of the holding member 50a and the inner peripheral surface 10A2 of the casing 10 are separated from each other. That is, the holding member 50a is not interference-fitted to the casing 10. On the other hand, the holding member 50a is fixed to the cover 72a by bringing an end portion 54A thereof on the direction Z1 side into contact with an end portion 72Aa of the cover 72a on the direction Z2 side. That is, the holding member 50a is fixed to the casing 10 through the cover 72a. More specifically, in the holding member 50a, the extension portion 54 is fixed to the cover 72a and the casing 10 by being sandwiched between the end portion 72Aa of the cover 72a and the seat surface 10B of the casing 10 and receiving a compressive load in direction Z from the end portion 72Aa and the seat surface 10B.

Here, the length of the holding member 50a along direction Z from the surface 50C to the end portion 54A is defined as a length D3. Additionally, when the cover 72a is attached to the casing 10, the distance from the end portion 72Aa of the cover 72a to the seat surface 10B of the casing 10 along direction Z is defined as a distance D4. Then, the difference between the length D3 and the distance D4 when the holding member 50a is removed from the casing 10 is defined as a dimensional difference Da. That is, it can also be said that the dimensional difference Da is a value obtained by subtracting the distance D4 from the length D3, when the holding member 50a is inserted into the casing 10 and fixed to the cover 72a and the casing 10 and then the holding member 50a is removed from the casing 10.

In the present embodiment, before the use of the rotary electric machine 100a, the holding member 50a assembled to the rotary electric machine 100a is in a state before permanent growth, and the casing 10 and the cover 72a assembled to the rotary electric machine 100a are in a permanently grown state. For this reason, when the rotary electric machine 100a is used, the holding member 50a grows permanently, while the casing 10 and the cover 72a do not grow any more. Accordingly, after the use of the rotary electric machine 100a, the length D3 of the holding member 50a increases due to the permanent growth, while the distance D4 between the casing 10 and the cover 72a does not change due to permanent growth. Hence, the dimensional difference Da after the use of the rotary electric machine 100a is larger than the dimensional difference Da before the use of the rotary electric machine 100a, and as a result, the compressive load increases. As described above, in the present embodiment, with the use of the rotary electric machine 100a, the dimensional difference Da increases, the compressive load on the holding member 50a increases, and the force for fixing the holding member 50a to the casing 10 increases. Hence, according to the rotary electric machine 100a of the present embodiment, the holding member 50a can be held appropriately in the casing 10. Note that when the casing 10 and the cover 72a are before permanent growth, the casing 10 and the cover 72a also grow permanently with the use of the rotary electric machine 100a, the distance D4 becomes smaller, and the dimensional difference Da increases even more. On the other hand, in the present embodiment, by using the permanently grown casing 10 and cover 72a, damage to the holding member 50a due to an excessive increase in the dimensional difference Da can be curbed.

Figure 8:
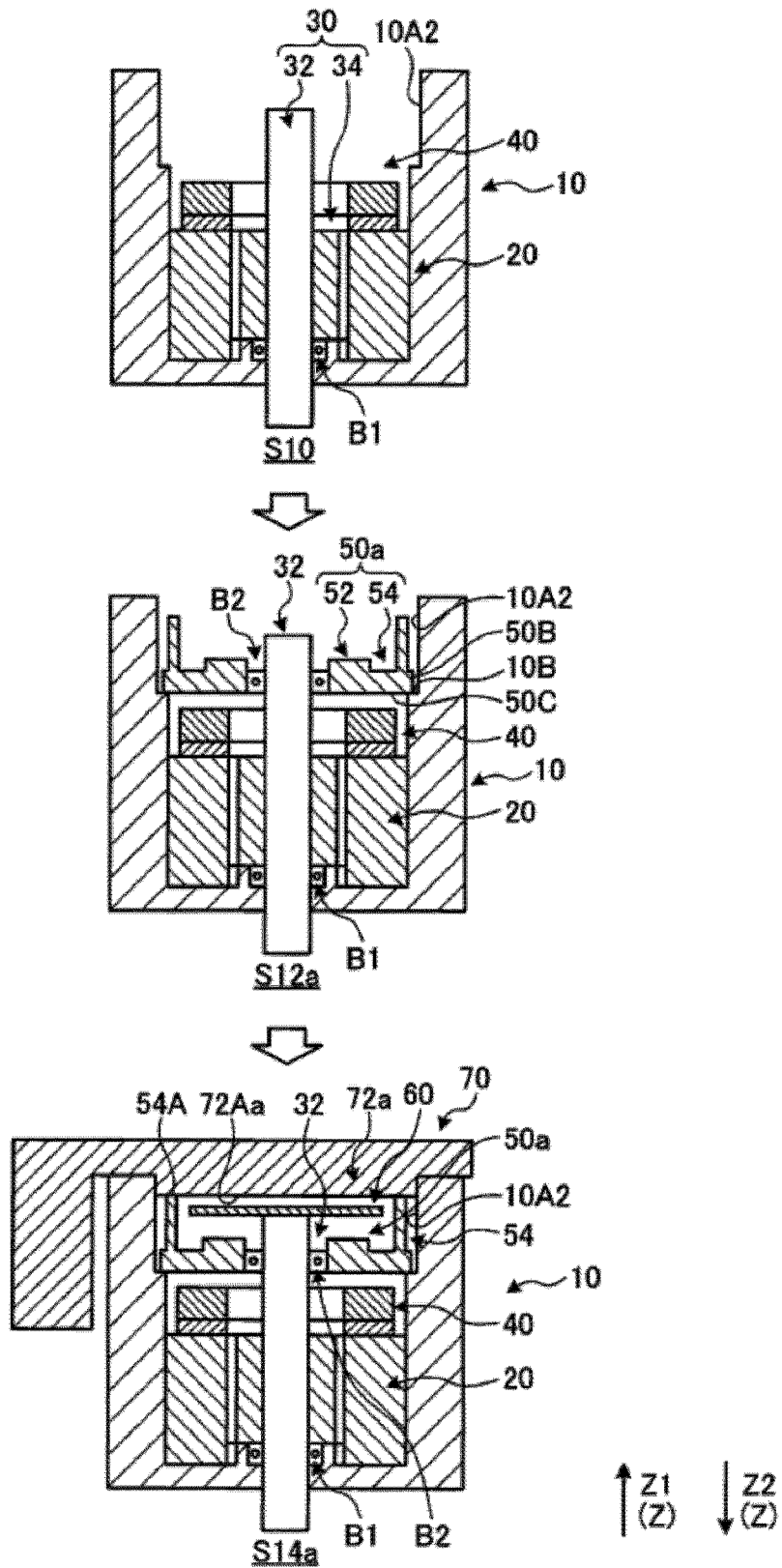
FIG. 8 is a diagram illustrating a manufacturing method of a rotary electric machine according to the second embodiment.

Next, a manufacturing method of the rotary electric machine 100 will be described. FIG. 8 is a diagram illustrating a manufacturing method of the rotary electric machine according to the second embodiment. As shown in FIG. 8, when manufacturing the rotary electric machine 100a, a stator 20, a rotor 30, and a bus bar unit 40 are inserted into the permanently grown casing 10 (step S10). What is more, prior to step S10, the casing 10 and cover 72a may be heated to bring the casing 10 and cover 72a into a permanently grown state.

Then, the holding member 50a in the state before permanent growth is inserted into the permanently grown casing 10 (step S12a). In step S12a, the holding member 50a is inserted into the casing 10 to bring the surface 50C of the holding member 50a into contact with the seat surface 10B of the casing 10. Then, a board 60 and the cover member 70a are assembled to the casing 10 and the cover member 70a is fixed to the casing 10 (step S16). The cover member 70a is fixed to the casing 10 so that the end portion 72Aa is in contact with the end portion 54A of the holding member 50a. The holding member 50a is fixed to the casing 10 by being sandwiched between the end portion 72Aa of the cover member 70a and the seat surface 10B of the casing 10. Thus, the production of the rotary electric machine 100a is completed. When the rotary electric machine 100a manufactured in this manner is used, the holding member 50a grows permanently to be fixed more firmly to the casing 10.

As described above, the casing 10 has an opening in a portion (direction Z1 side) opposite to the part where the stator 20 is provided in the part where the holding member 50a is formed, in the extending direction (direction Z) of the drive shaft 32. The rotary electric machine 100a further includes the cover member 70a provided in the opening and fixed to the casing 10. The holding member 50a is fixed in the casing 10 by coming into contact with the cover member 70a. In the rotary electric machine 100a according to the second embodiment, the holding member 50a and the cover member 70a come into contact with each other. For this reason, with the use of the rotary electric machine 100a, the holding member 50a grows permanently, so that the compressive load acting on the holding member 50a increases, and the holding member 50a is fixed more firmly to the casing 10. Hence, according to the rotary electric machine 100a according to the second embodiment, the holding member 50a can be held appropriately in the casing 10.

Third Embodiment

Next, a third embodiment will be described. A rotary electric machine 100b according to the third embodiment is different from the first embodiment in that a holding member 50b is made of a plurality of members. In the third embodiment, the parts having the same configuration as the first embodiment will not be described.

Figure 9:
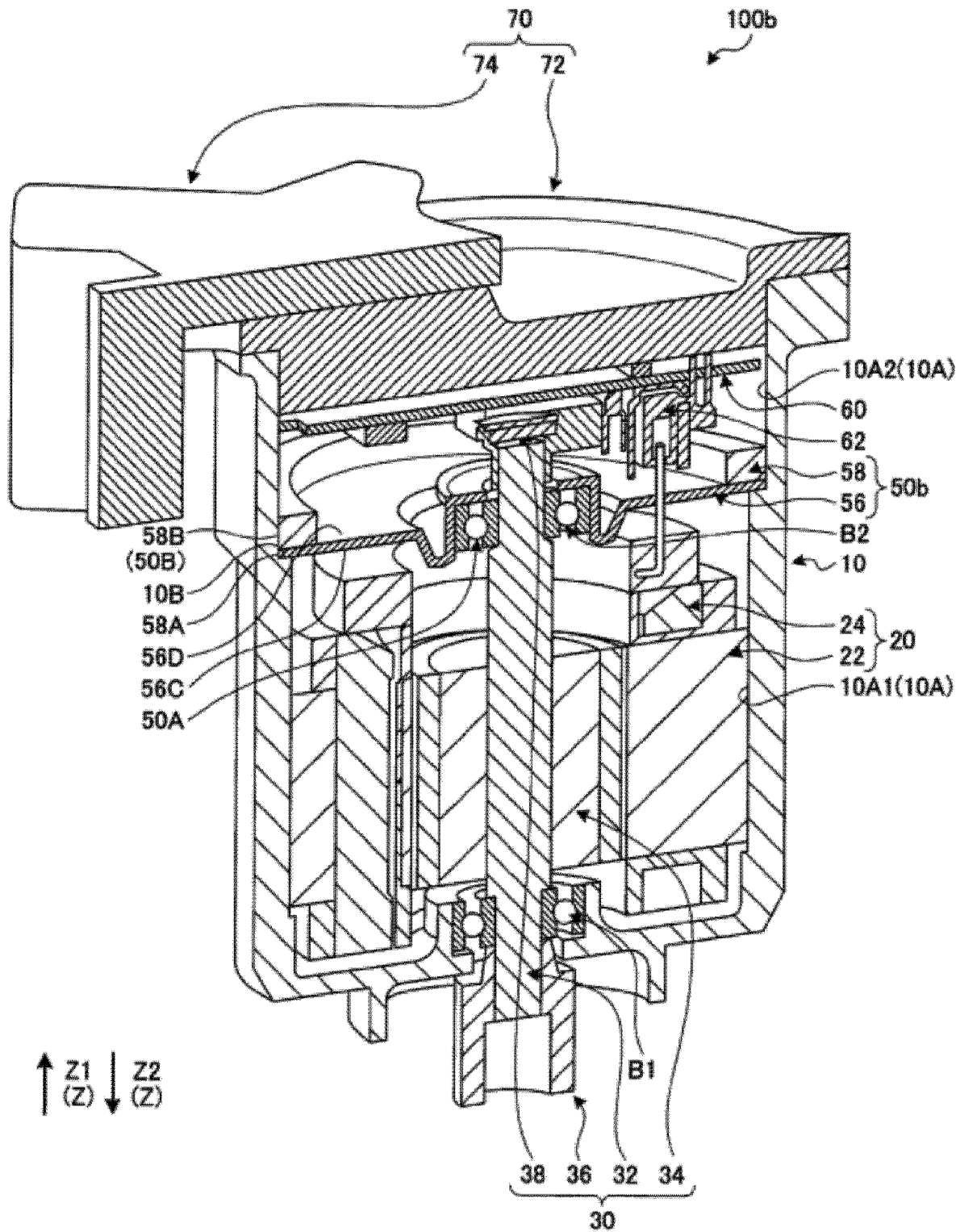
FIG. 9 is a cross-sectional view of a rotary electric machine according to a third embodiment.

FIG. 9 is a cross-sectional view of the rotary electric machine according to the third embodiment. As shown in FIG. 9, the holding member 50b of the rotary electric machine 100b according to the third embodiment includes a bearing holder 56 and a ring 58. The bearing holder 56 is provided on the direction Z1 side of a bus bar unit 40 in a space SP of a casing 10. The bearing holder 56 is a plate-shaped (disc-shaped in this example) member that holds a bearing B2. The bearing holder 56 has a through hole 50A formed at the center position when viewed in direction Z, and the bearing B2 is provided in the through hole 50A. Note that the material of the bearing holder 56 is arbitrary, but may be the same material as that of the casing 10, for example.

The ring 58 is an annular member. The ring 58 is made of an aluminum alloy member. More specifically, the ring 58 is made of an ADC12 member. Note, however, that the ring 58 does not necessarily have to be made of ADC12, and may be made of an aluminum alloy that undergoes permanent growth. The ring 58 is provided on the direction Z1 side of the bearing holder 56 in the space SP of the casing 10.

Figure 10:
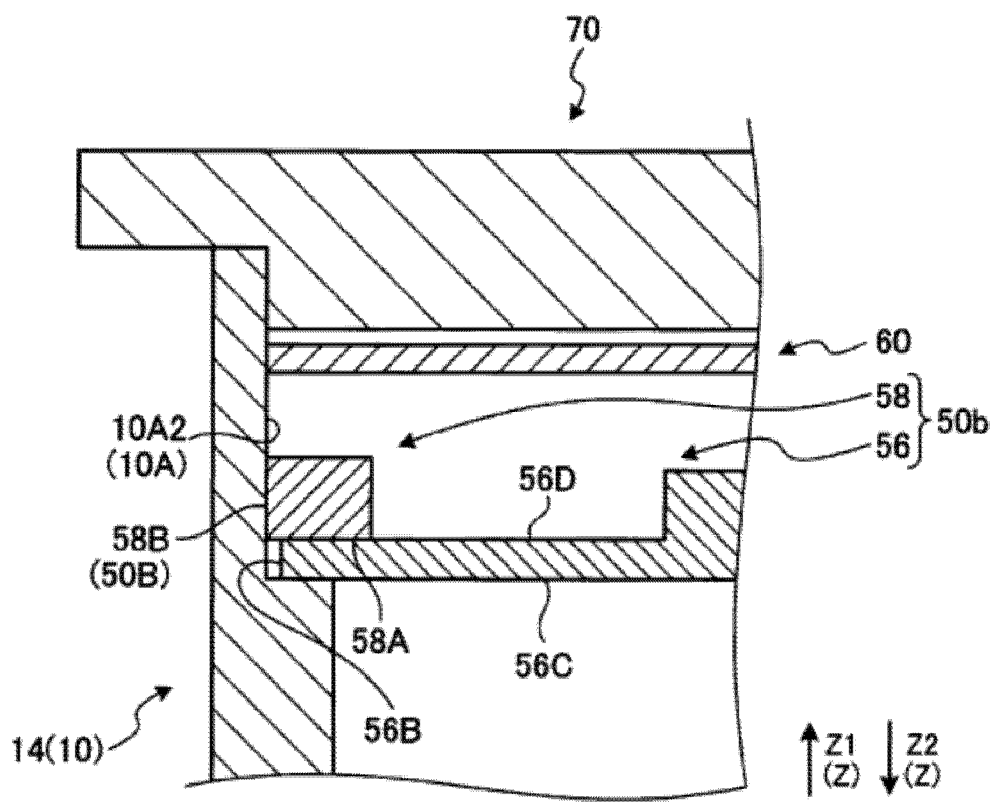
FIG. 10 is a schematic view showing a fixed state of a holding member according to the third embodiment.

FIG. 10 is a schematic view showing a fixed state of the holding member according to the third embodiment. As shown in FIG. 10, a surface 56C of the bearing holder 56 on the direction Z2 side is in contact with a seat surface 10B of the casing 10. Additionally, in the bearing holder 56, an outer peripheral surface 56B is not in contact with an inner peripheral surface 10A2 of the casing 10, and the outer peripheral surface 56B of the bearing holder 56 and the inner peripheral surface 10A2 of the casing 10 are separated from each other. That is, the bearing holder 56 is not interference-fitted to the casing 10. On the other hand, the ring 58 is fixed to the casing 10 by bringing an outer peripheral surface 58B into contact with the inner peripheral surface 10A2 of the casing 10. That is, the ring 58 is interference-fitted to the casing 10. In the third embodiment, the outer peripheral surface 58B of the ring 58 corresponds to an outer peripheral surface 50B of a holding member 50b that comes into contact with the inner peripheral surface 10A2 of the casing 10. Additionally, in the ring 58, a surface 58A on the direction Z2 side is in contact with a surface 56D of the bearing holder 56 on the direction Z1 side. The ring 58 comes into contact with the bearing holder 56 to fix the bearing holder 56 to the casing 10. That is, the bearing holder 56 is fixed to the casing 10 through the ring 58.

Similar to the holding member 50 of the first embodiment, the ring 58 is in a state before permanent growth before the use of the rotary electric machine 100b. Additionally, in the third embodiment, the outer diameter of the ring 58 corresponds to the outer diameter D2 of the holding member 50 described in the first embodiment. Since a dimensional difference D between an outer diameter D2 of the holding member 50b (ring 58) and an inner diameter D1 of the casing 10 in the third embodiment is similar to that in the first embodiment, the description thereof will be omitted. In the third embodiment, the ring 58 is in a state before permanent growth before the use of the rotary electric machine 100b. For this reason, when the rotary electric machine 100b is used, the ring 58 grows permanently, so that the tightening margin (dimensional difference D) between the ring 58 and the casing 10 increases. Accordingly, in the third embodiment, too, the holding member 50b can be held appropriately in the casing 10.

Figure 11:
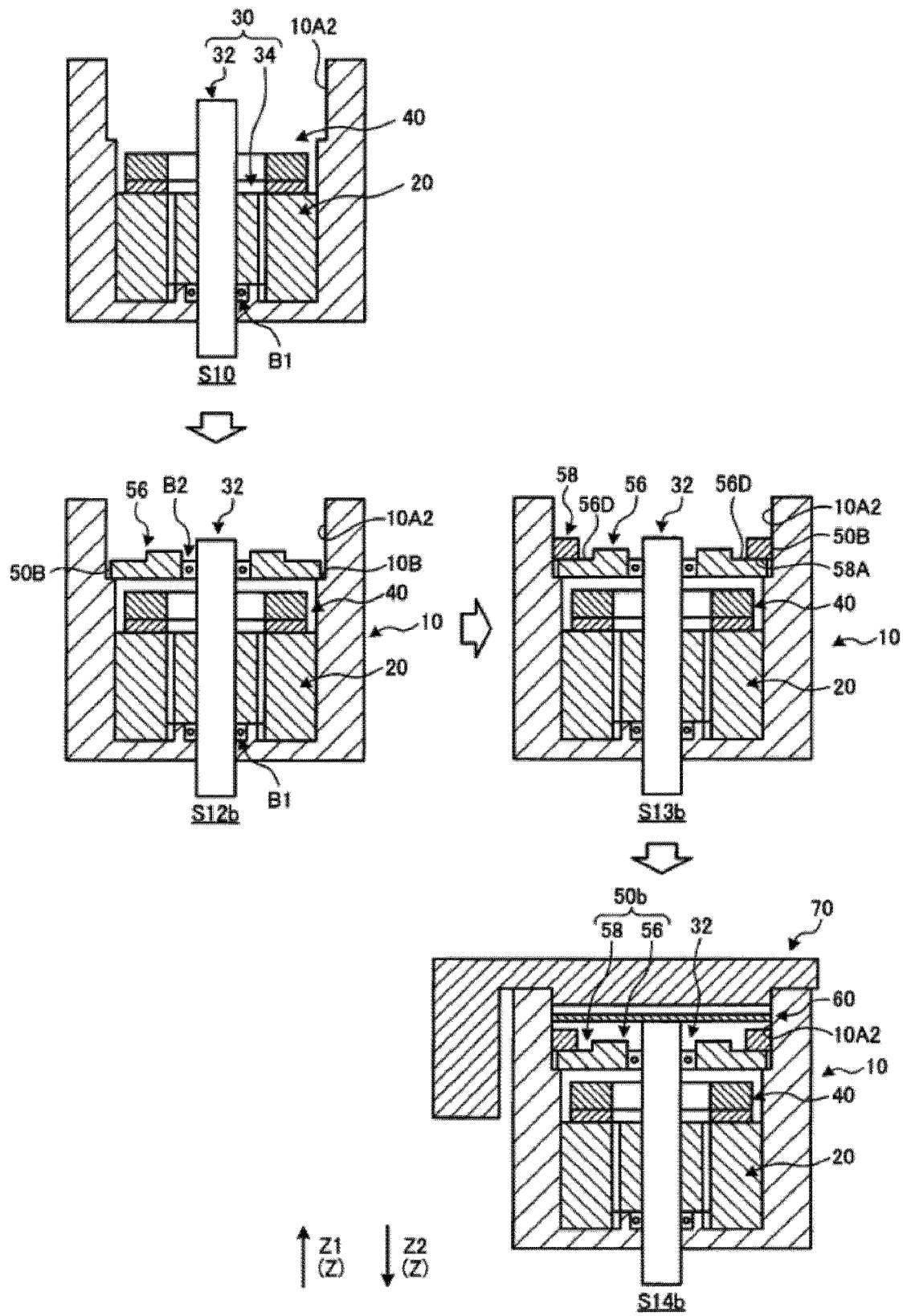
FIG. 11 is a diagram illustrating a manufacturing method of a rotary electric machine according to the third embodiment.

Next, a manufacturing method of the rotary electric machine 100b will be described. FIG. 11 is a diagram illustrating a manufacturing method of the rotary electric machine according to the third embodiment. As shown in FIG. 11, when manufacturing the rotary electric machine 100b, a stator 20, a rotor 30, and the bus bar unit 40 are inserted into the permanently grown casing 10 (step S10). What is more, similar to the first embodiment, the casing 10 may be heated to bring the casing 10 into a permanently grown state prior to step S10.

Then, the bearing holder 56 is inserted (step S12b) and the ring 58 is inserted (step S13b) into the permanently grown casing 10. In step S12b, the bearing holder 56 is inserted into the casing 10 to bring a surface 50C of the bearing holder 56 into contact with the seat surface 10B of the casing 10. Then, in step S14b, the ring 58 is inserted into the casing 10 to bring the surface 58A of the ring 58 into contact with the surface 56D of the bearing holder 56. Then, the inner peripheral surface 10A2 of the casing 10 and the outer peripheral surface 58B (outer peripheral surface 5B) of the ring 58 are brought into contact with each other, so that the ring 58 is fixed to the casing 10 and is in an interference-fitted state. As a result, the bearing holder 56 is fixed to the casing 10 through the ring 58. Note that when inserting the ring 58 into the casing 10, too, shrink fitting may be used similar to the first embodiment. Thereafter, a board 60 and a cover member 70 are assembled to the casing 10 (step S14b) to complete the production of the rotary electric machine 100b. When the rotary electric machine 100b manufactured in this manner is used, the ring 58 grows permanently to be fixed more firmly to the casing 10.

As described above, the holding member 50b according to the third embodiment includes the bearing holder 56 that holds the bearing B2 and the annular ring 58. The ring 58 is in contact with the surface 56D of the bearing holder 56. The ring 58 is made of an aluminum alloy member, and is in a state before permanent growth before the use of the rotary electric machine 100b, that is, before the ring 58 is fixed to the casing 10. The ring 58 fixes the bearing holder 56 in the casing 10 by bringing the outer peripheral surface 58B (outer peripheral surface 50B) into contact with the inner peripheral surface 10A2 of the casing 10. In the holding member 50b according to the third embodiment, the ring 58 grows permanently with the use of the rotary electric machine 100b, so that the tightening load between the ring 58 and the casing 10 increases, and the force for fixing the bearing holder 56 to the casing 10 increases. Hence, according to the rotary electric machine 100b according to the third embodiment, the holding member 50b can be held appropriately in the casing 10.

EXPERIMENTAL EXAMPLE

Figure 12:
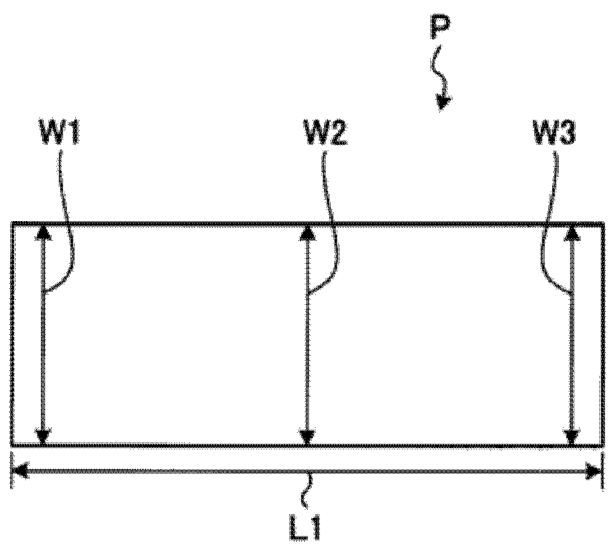
FIG. 12 is a schematic view of a test piece according to an experimental example.

Next, an experimental example will be described. In the experimental example, permanent growth of a test piece P made of the same material (member) as the casing 10 was measured. FIG. 12 is a schematic diagram of the test piece according to the experimental example, and FIGS. 13 to 16 are graphs showing the permanent growth amount of the test piece. As shown in FIG. 12, in the experimental example, a rectangular plate-shaped test piece P was used to permanently grow the test piece P. In the experimental example, the test piece P which was not permanently grown, that is, which was not placed in the permanent growth environment, was heated to each temperature, and the dimensions of the test piece P were measured. Specifically, a length L1 of the long side of the test piece P, a length (width) W1 of the short side at one end in the long side direction of the test piece P, a length (width) W2 of the short side at the center position in the long side direction of the test piece P, and a length (width) W3 of the short side at the other end in the long side direction of the test piece P were measured. What is more, in the experimental example, the lengths L1, W1, W2, and W3 of the test piece P in the non-permanently grown state, that is, the test piece P before heating, at 25° C. were measured. Then, the test piece P was heated at a set heating temperature for a set time, then returned to 25° C., and the lengths L1, W1, W2, and W3 were measured. Then, the dimensional difference of the lengths L1, W1, W2, and W3 before and after heating was calculated, and the rate of dimensional change (%) was calculated. The rate of change here refers to the ratio of the difference between the length after heating and the length before heating to the length before heating (lengths L1, W1, W2, W3). That is, it can be said that the rate of change is a value indicating the permanent growth amount.

Figure 13:
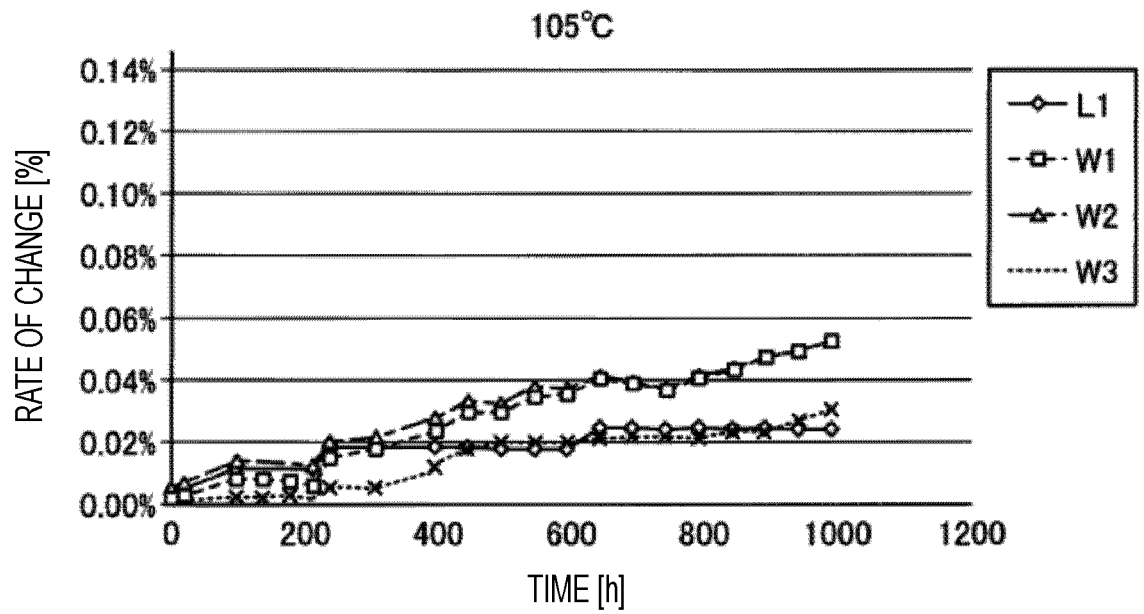
FIG. 13 is a graph showing the permanent growth amount of a test piece.

FIG. 13 shows the rate of change when the test piece P was heated at 105° C. In FIG. 13, the horizontal axis represents the elapsed heating time, and the vertical axis represents the measured values of the lengths L1, W1, W2, and W3 for each heating time. In the experimental example according to FIG. 13, the test piece P before permanent growth was heated in an environment of 105° C. (heating temperature), heated for a predetermined heating time to measure the lengths L1, W1, W2, and W3, and then heated further to measure the lengths L1, W1, W2, and W3 at each elapsed heating time. Then, for each test piece P, the lengths L1, W1, W2, and W3 were measured before and after heating, and the rate of change for each heating time was calculated. As shown in FIG. 13, when the heating temperature is 105° C., the test piece P grows permanently, and it can be seen that the longer the heating time, the larger the permanent growth amount. Note that in the experimental examples of FIG. 14 and following drawings, the rate of change for each heating time was calculated under similar conditions as in the experimental example of FIG. 13 except for the heating temperature.

Figure 14:
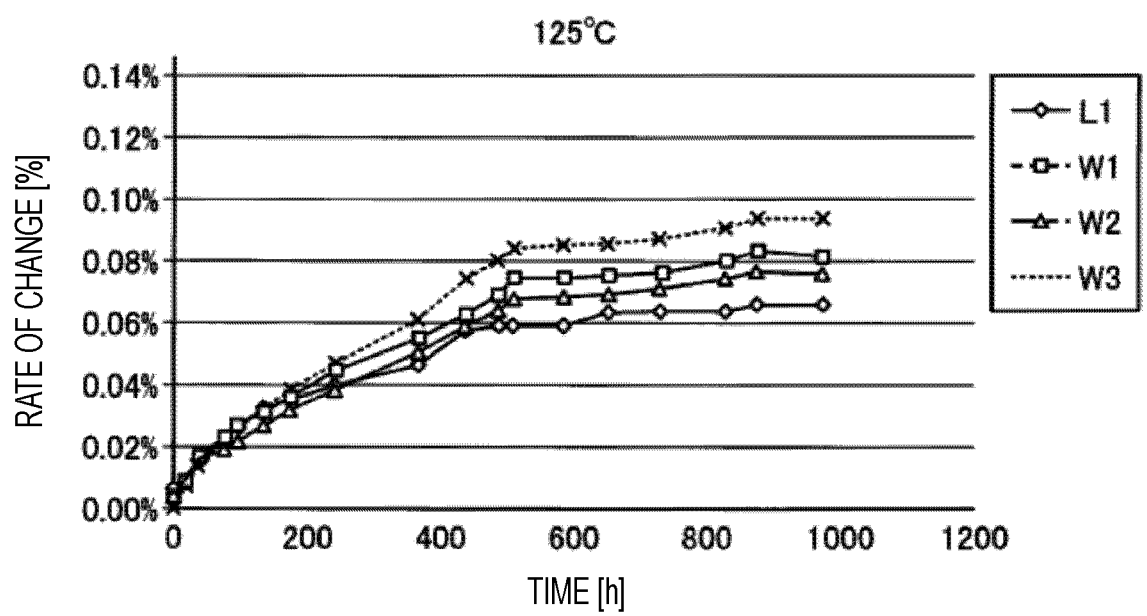
FIG. 14 is a graph showing the permanent growth amount of the test piece.

FIG. 14 shows the rate of change when the test piece P was heated at 125° C. In the experimental example of FIG. 14, the test piece P before permanent growth was heated in an environment of 125° C. (heating temperature), and the rate of change for each heating time was calculated. As shown in FIG. 14, it can be seen that the test piece P grows permanently when the heating temperature is 125° C. Additionally, it can be seen that the longer the heating time, the larger the permanent growth amount, and the permanent growth amount becomes almost constant in about 500 hours.

Figure 15:
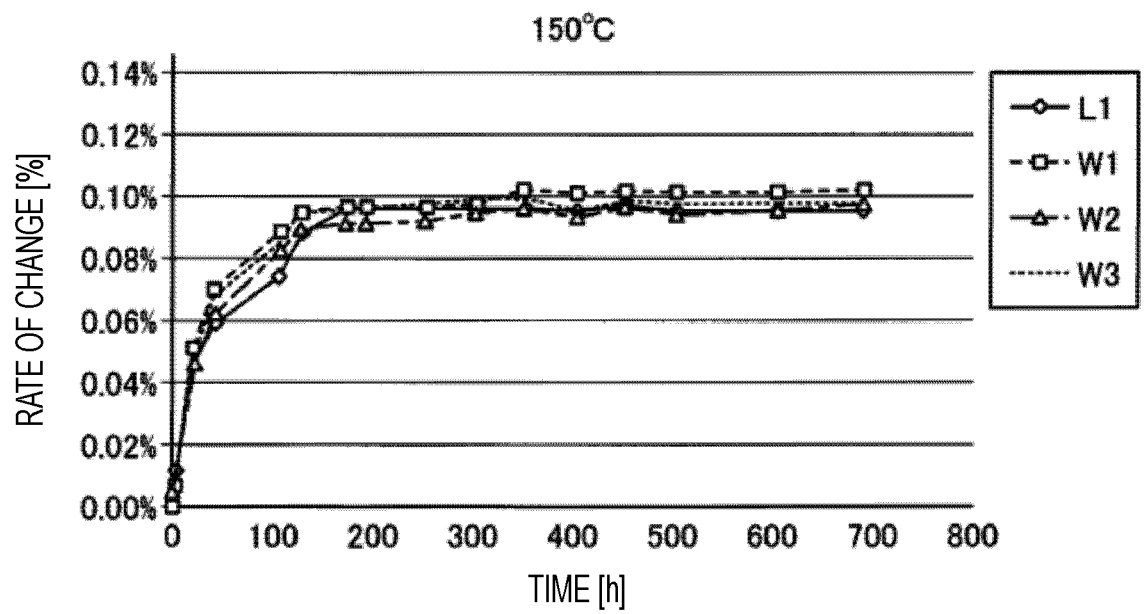
FIG. 15 is a graph showing the permanent growth amount of the test piece.

FIG. 15 shows the rate of change when the test piece P was heated at 150° C. In the experimental example of FIG. 15, the test piece P before permanent growth was heated in an environment of 150° C. (heating temperature), and the rate of change for each heating time was calculated. As shown in FIG. 15, it can be seen that the test piece P grows permanently when the heating temperature is 150° C. Additionally, it can be seen that the longer the heating time, the larger the permanent growth amount, and the permanent growth amount becomes almost constant in about 150 hours.

Figure 16:
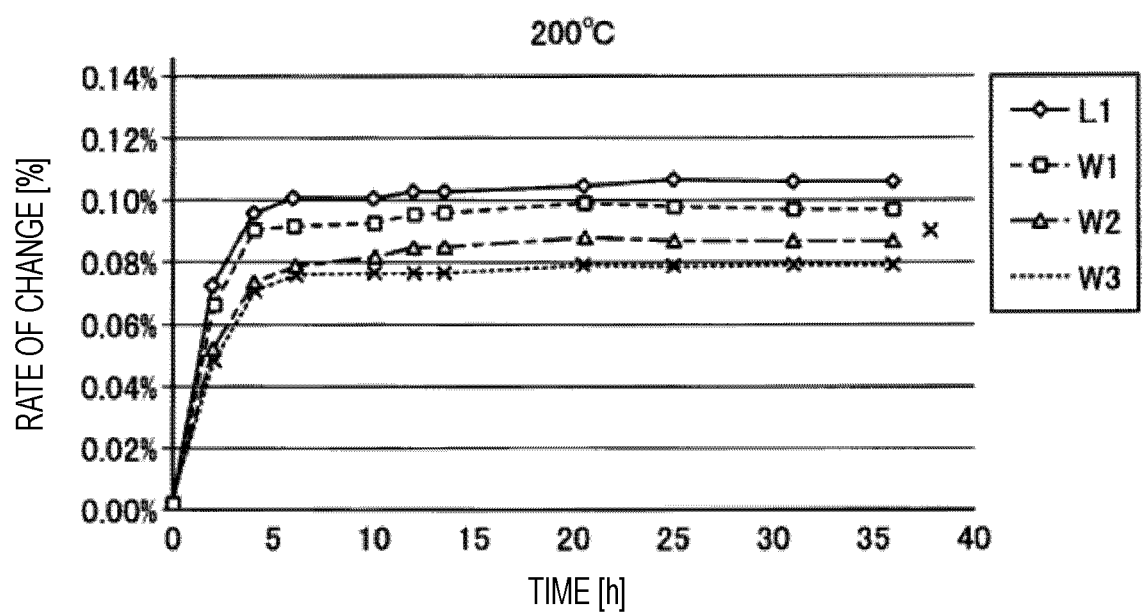
FIG. 16 is a graph showing the permanent growth amount of the test piece.

FIG. 16 shows the rate of change when the test piece P was heated at 200° C. In the experimental example of FIG. 16, the test piece P before permanent growth was heated in an environment of 200° C. (heating temperature), and the rate of change for each heating time was calculated. As shown in FIG. 16, it can be seen that the test piece P grows permanently when the heating temperature is 200° C. Additionally, it can also be seen that the longer the heating time, the larger the permanent growth amount, and the permanent growth amount becomes almost constant in about five hours.

As described above, it can be seen that the test piece P using the same material as the casing 10 grows permanently when heated at a heating temperature of 105° C. or higher and 250° C. or lower. Additionally, it can be seen that the maximum amount of change, that is, the maximum amount of permanent growth is about 0.12%.

While the embodiments of the present invention have been described above, embodiments are not limited by the contents of these embodiments and the like. Additionally, the components described above include those that are easily assumable by those skilled in the art, those that are substantially the same, and those that are in a so-called equivalent range. Moreover, the components described above can be combined appropriately. Furthermore, various omissions, replacements or changes of the components can be made without departing from the gist of the above-described embodiments.

According to the present disclosure, a holding member can be held appropriately in a casing.

REFERENCE SIGNS LIST 10 casing
10A inner peripheral surface
12 bottom portion
14 side portion
20 stator
20A outer peripheral surface
22 stator core
24 stator coil
30 rotor
32 drive shaft
34 rotor core
40 bus bar unit
50 holding member
60 board
70 cover member
100 rotary electric machine
B2 bearing

The invention claimed is:

1. A rotary electric machine comprising:
a rotor having a drive shaft;
a stator provided on an outer periphery of the rotor;
a bearing that rotatably supports the drive shaft;
a holding member that contains an aluminum alloy member and holds the bearing; and
a casing that houses the rotor, the stator, the bearing, and the holding member, wherein
the casing is made of a member that does not grow permanently or an aluminum alloy member that has grown permanently before fixing the holding member to the casing, and
the holding member is in a state before permanent growth when fixed in the casing, and the holding member grows permanently to be fixed more firmly to the casing.

2. The rotary electric machine according to claim 1, wherein in the holding member, a ratio of an outer diameter when returned to room temperature after heating at 200° C. for five hours to an outer diameter at room temperature is 100.1% or more and 100.14% or less.

3. The rotary electric machine according to claim 1, wherein the holding member includes an ADC12 member.

4. The rotary electric machine according to claim 1, wherein the holding member is fixed in the casing by bringing an outer peripheral surface into contact with an inner peripheral surface of the casing.

5. The rotary electric machine according to claim 1, wherein
the casing has an opening in a portion opposite to a part where the stator is provided in a part where the holding member is provided, in an extending direction of the drive shaft,
the rotary electric machine further comprises a cover member provided in the opening and fixed to the casing, and
the holding member is fixed in the casing by coming into contact with the cover member.

6. The rotary electric machine according to claim 1, wherein
the holding member includes a bearing holder that holds the bearing, and an annular ring that is in contact with a surface of the bearing holder and is made of an aluminum alloy member in a state before permanent growth before being fixed to the casing, and
the ring fixes the bearing holder in the casing by bringing an outer peripheral surface into contact with an inner peripheral surface of the casing.

7. A manufacturing method of a rotary electric machine including a rotor having a drive shaft, a stator provided on an outer periphery of the rotor, a bearing that rotatably supports the drive shaft, a holding member that contains an aluminum alloy member and holds the bearing, and a casing that houses the rotor, the stator, the bearing, and the holding member, the manufacturing method comprising
an insertion step of inserting the holding member before permanent growth into the casing made of a member that does not grow permanently or an aluminum alloy member that has permanently grown.

* * * * *